Sept. 27, 1949.  E. H. HIGHAM  2,483,140
CATHODE-RAY OSCILLOGRAPHIC APPARATUS
Filed Nov. 2, 1948  2 Sheets-Sheet 1

Inventor:
Edward H. Higham,
by Merton D. Moore
His Attorney.

Sept. 27, 1949.  E. H. HIGHAM  2,483,140
CATHODE-RAY OSCILLOGRAPHIC APPARATUS
Filed Nov. 2, 1948  2 Sheets-Sheet 2

Inventor:
Edward H. Higham,
by Merton D. Moore
His Attorney.

Patented Sept. 27, 1949

2,483,140

UNITED STATES PATENT OFFICE 2,483,140

CATHODE-RAY OSCILLOGRAPHIC APPARATUS

Edward H. Higham, Hale, England, assignor to General Electric Company, a corporation of New York Application November 2, 1948, Serial No. 57,853
In Great Britain November 6, 1947

4 Claims. (Cl. 315—22)

This invention relates to apparatus for displaying varying electrical quantities on the screen of a cathode ray tube and has an important application in apparatus for displaying a plurality of items of information on the same cathode ray tube, as for example, in electrocardiography.

According to the present invention, apparatus for displaying a varying electrical quantity on a cathode ray tube screen includes deflecting means, having a component acting at right angles to the trace axis and controlled by a relatively fast time base and a component acting parallel to the trace axis and controlled by a relatively slow time base, and means for producing brightening pulses during each fast sweep at instants controlled by the magnitude of the quantity to be displayed. In this way a spot is produced on the screen during each cycle of the fast time base, spaced from the trace axis by an amount dependent on the magnitude and quantity to be displayed, and successive spots are shifted along the axis by the slow time base to simulate a continuous trace.

In carrying out the invention the brightening pulses may be produced by utilizing the fast time base to vary the instant of triggering a pulse generator, and then varying the triggering point in accordance with the magnitude of the quantity to be displayed.

Apparatus as specified above may be employed for producing simultaneous displays of a plurality of varying quantities on the same cathode ray tube screen by causing the fast time base to control a plurality of triggered pulse generators arranged to act successively, the instant of triggering of each generator being varied in accordance with the respective quantity to be displayed.

In such a multiple-trace system, each pulse generator is normally triggered to produce a pulse at a different predetermined position on the fast time base. In the case of a voltage time base such as a saw-tooth, the pulse generator comprises voltage responsive apparatus arranged to produce a short pulse when the time base voltage or saw-tooth voltage reaches a predetermined value. The time base voltage in such a case may be either an increasing voltage or a decreasing voltage.

For additional objects and advantages, and for a better understanding of the invention, attention is now directed to the following description and accompanying drawings, and also to the appended claims in which the features of the invention believed to be novel are particularly pointed out.

Figure 1:
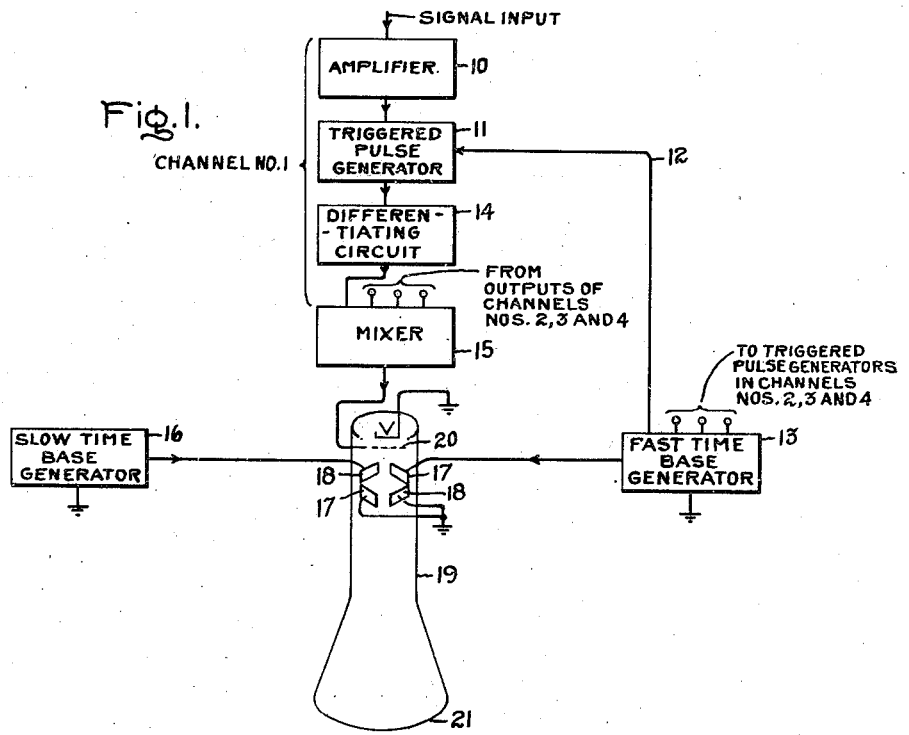
Fig. 1 is a block diagram showing the general arrangement of apparatus embodying the invention.

The arrangement of Fig. 1 provides means for simultaneously displaying the waveforms of voltages supplied over four different channels, but only shows in detail the apparatus for the first channel, since the apparatus for each channel may be the same. The input voltage to channel No. 1, which might for instance be the output voltage from an electrocardiograph, is fed to an amplifier 10 and thence to a triggered pulse generator 11. As will shortly be described in greater detail, the instant of triggering generator 11 is conjointly controlled by the signals from amplifier 10 and by a sawtooth voltage supplied over conductor 12 from a fast time base generator 13. At a certain point of time in the sweep cycle of generator 13, generator 11 supplies a pulse voltage to a suitable differentiating circuit 14, which differentiates the leading edge to produce a sharp pulse, in well-known manner. The resultant pulse is then passed to the mixer 15, by which a brightening pulse is applied to the grid of the cathode ray tube.

In the illustrative system of Fig. 1, three other identical channels Nos. 2, 3 and 4 may also be provided to supply brightening pulses to mixer 15 at instants of time determined conjointly by the respective input signals and by voltages from fast time base generator 13.

It will be observed that a fast time base voltage is applied from generator 13 across the Y-plates 17 and a slow time base voltage is applied from a generator 16 across the X-plates 18 of a cathode ray tube 19. Whenever a pulse is supplied from mixer 15 to a control grid 20, a spot is produced on the screen 21 of cathode ray tube. In the absence of input signals, the time base generators 13 and 16 determine the spot position, but the position of the spot with references to the X-axis is also modified by the output from the amplifier so as to cause a spot to be produced earlier or later in each fast sweep along the Y-axis, in accordance with the instantaneous magnitude of the quantity to be displayed. Thus, assuming at the moment that there is no output from the amplifier 10, the spot will be produced at the same position in each sweep of the fast time base 13, and as successive spots will also be shifted horizontally by the slow time base voltage applied to the X-plates, it follows that a straight line trace will be produced on the screen. If, however, there is an output from the amplifier 10 applied to the pulse generator 11, this trace will deviate from the straight line, the deviation being proportional to, or a function of, the quantity under investigation.

Figure 2:
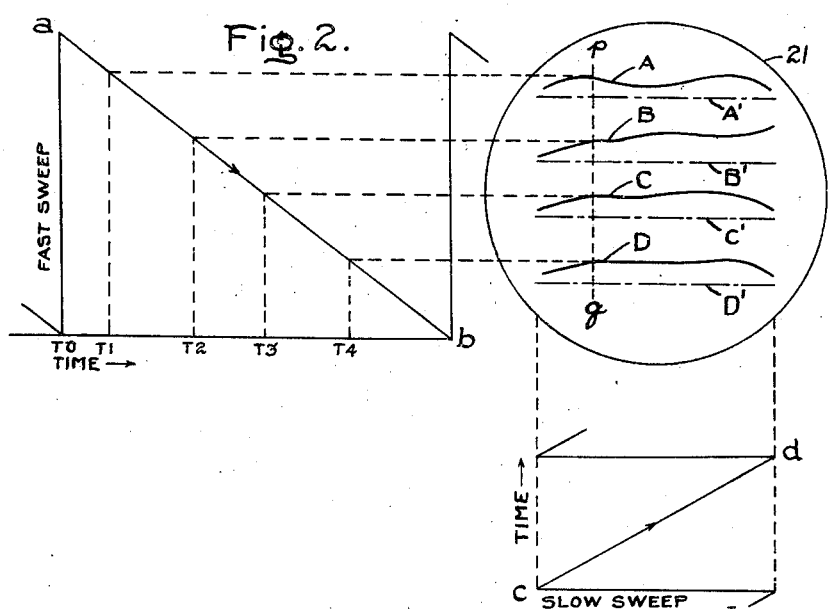
Fig. 2 illustrates the traces produced on a cathode ray tube screen showing the time bases graphically for the purposes of explanation.

In the actual example shown, four traces are produced simultaneously on the cathode ray tube screen 21 as shown in Fig. 2, the respective traces being indicated by letters A, B, C and D. The slow and fast sweep voltages are also indicated graphically adjacent the screen 21 in Fig. 2 to facilitate analysis of the waveforms. The time scale of the fast sweep is shown very greatly expanded relative to that of the slow sweep, since a large number of cycles of the fast sweep are actually produced during each cycle of the slow sweep.

Assuming for the moment that there is no output from any of the amplifiers and that the triggered pulse generators of each channel are set so that they operate in succession, it follows that four straight-line traces will be produced as shown in chain-dotted lines A', B', C' and D'. If, however, the input signal information is passed by the amplifiers to the pulse generators to vary the triggering points, it follows that these lines will deviate and will produce traces such as shown by the full lines A, B, C and D. In the figure, $ab$ represents one sweep of the fast time base, which effects the vertical shift, and $cd$ represents one sweep of the slow time base, which effects the horizontal shift. Taking one sweep of the fast time base, the locus of the spot, were it illuminated all the time, would follow the line $pq$. As, however, it is only illuminated at the instants of time T1, T2, T3, and T4, it follows that spots are produced each time the locus of the spot crosses a trace. The effect of the slow time base $cd$ is to shift the trace horizontally across the cathode ray tube screen, and thus each sweep of the fast time base produces spots in fresh positions slightly displaced to the right, so that the resultant effect is to depict the variation of each item over the time interval selected as the period of the slow time base. It is, of course, assumed that the cathode ray tube screen has sufficient afterglow properties to retain the trace throughout a sweep of the slow time base and that the frequency of the fast time base generator is so much higher than that of the slow time base generator that the individual spots appear to blend into a substantially continuous curve.

Figure 3:
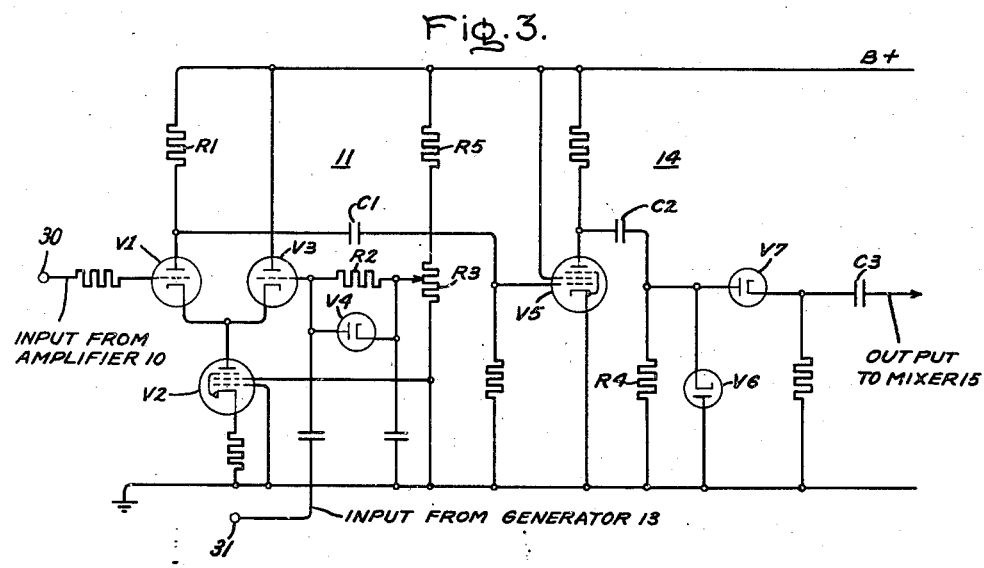
Fig. 3 is a circuit diagram showing one form of pulse generating circuit that may be used in the system of Fig. 1.

Fig. 3 shows one form of apparatus which may be used for the triggered pulse generator 11 and differentiating circuit 14. The output from the amplifier 10 is applied to the terminal 30 and thence to the grid of the valve V1. The fast time base voltage is applied to the terminal 31 and thence to the grid of the valve V3. Valves V1 and V3 form a multivibrator type of pulse generating circuit, their cathodes being connected together and the pentode valve V2 constituting a common cathode load. The arrangement is such that normally V3 is conducting and the voltage produced across the valve V2, due to the current through V3, applies a cathode bias to V1, holding the valve V1 cut off. The fast time base voltage decreases during each sweep and eventually this will reduce the current through V3 sufficiently to permit V1 to conduct. When this happens, there will be a changeover, and current due to V1 will apply grid bias to cut off V3 so that the effect is cumulative and a condition will be reached almost instantaneously where V3 is cut off and V1 conducting. The current through V1 will, due to the anode load R1, produce a voltage pulse having a negative-going leading edge at the anode of V1 and this will be applied to the control grid of V5 through coupling capacitor C1. This causes a pulse with a positive-going leading edge to be produced at the anode of amplifier valve V5, which is differentiated by the condenser C2 and resistance R4. The sharpened pulse is applied through a diode V7 and capacitor C3 to mixer 15 and thence to the grid of the cathode ray tube to effect momentary brightening of the trace. It will be appreciated that diodes V6 and V7 act as a clamping circuit to maintain the average level of the brightening pulse substantially steady. The valves V1 and V3 of the multivibrator are of course restored to their initial conditions by retrace of the fast sweep voltage to its initial positive-going value.

The vertical separation of the traces may be adjusted by the potentiometer R3 which varies the steady bias applied to the grid of V3 from R3 and R5 across the common B+ supply.

R2 and V4 constitute a D. C. restorer circuit which limits the positive swing of the saw tooth voltage and hence fixes the starting voltage of V3.

While a specific embodiment has been shown and described, it will of course be understood that various modifications may be made without departing from the invention. The appended claims are therefore intended to cover any such modifications within the true spirit and scope of the invention.

What I claim as new and desire to secure by Letters Patent of the United States is:

1. Oscillographic apparatus for analyzing the waveform of an unknown electrical quantity, comprising a cathode ray tube having a ray intensity control electrode, means for cyclically deflecting the ray in a first direction at a relatively low frequency, means for cyclically deflecting the ray in a second direction at a relatively high frequency, a multivibrator adapted to be triggered to produce a train of pulses recurring at said high frequency, means controlled by said second means for normally triggering said multivibrator to initiate a pulse at a predetermined point of time in each cycle of said high frequency sweep, means for sharply altering the voltage on said control electrode in response to initiation of each said pulse, and means for varying the instant of triggering said multivibrator with respect to said point of time as a function of the magnitude of said unknown quantity.

2. Oscillographic apparatus for analyzing the waveform of an unknown electrical quantity, comprising a cathode ray tube having a pair of coordinate ray deflecting elements and a ray intensity control electrode, a low frequency sawtooth wave generator for energizing one of said elements to sweep the ray along one coordinate, a high frequency sawtooth wave generator for energizing the other of said elements to sweep the ray along a transverse coordinate a plurality of times during each sweep along said one coordinate, a multivibrator adapted to be triggered to generate a rectangular pulse wave, means utilizing said high frequency wave for normally triggering said multivibrator to initiate a rectangular pulse at a predetermined point of time in each cycle of said high frequency wave, means for generating a sharp unidirectional voltage pulse in response to initiation of each said rectangular pulse, means for supplying said sharp pulse to said electrode to intensify said ray momentarily, and means for varying the instant of triggering said multivibrator with respect to said point of time as a function of the magnitude of said unknown quantity.

3. Oscillographic apparatus for simultaneously analyzing the waveforms of a plurality of potentials, comprising a cathode ray device having a pair of coordinate ray deflecting elements and a ray intensity control electrode, a low frequency sweep wave generator connected to one of said elements, a high frequency sweep wave generator connected to the other of said elements, a plurality of multivibrators each adapted to be triggered to produce a train of pulses recurring at said high frequency, means utilizing said high frequency sweep wave for normally triggering each of said multivibrators to initiate a pulse during each cycle of said high frequency wave, means for individually adjusting each multivibrator to cause said pulses to be initiated at different points of time in said cycle, means for applying a voltage to said electrode to alter the intensity of said ray momentarily in response to triggering of each multivibrator, and means for individually varying the instant of triggering of each multivibrator with respect to said normal triggering point as a function of the instantaneous magnitude of a different one of said potentials.

4. Oscillographic apparatus for simultaneously analyzing the waveforms of a plurality of potentials, comprising a cathode ray device having a pair of coordinate ray deflecting elements and a ray intensity control electrode, means normally biasing said electrode for low ray intensity, a low frequency sawtooth wave generator connected to one of said elements, a high frequency sawtooth wave generator connected to the other of said elements, a plurality of multivibrators each adapted to be triggered to initiate a pulse in response to an applied voltage exceeding a certain value, means utilizing said high frequency sweep wave to apply a sawtooth triggering voltage to all said multivibrators simultaneously, means for individually adjusting each of said multivibrators to initiate a pulse at a different level of said sawtooth voltage, means for supplying a sharp unidirectional voltage pulse to said control electrode to intensify said ray momentarily each time a multivibrator is triggered, and means for supplying one of said potentials to each multivibrator to vary the triggering voltage level as a function of said potential.

EDWARD H. HIGHAM.

No references cited.